Dec. 25, 1945.  C. E. KENNEY  2,391,786
TURBINE NOZZLE STRUCTURE
Filed May 18, 1944  3 Sheets-Sheet 1

Inventor
C. E. Kenney
by K. S. Wyman
Attorney

Dec. 25, 1945.    C. E. KENNEY    2,391,786
TURBINE NOZZLE STRUCTURE
Filed May 18, 1944    3 Sheets-Sheet 2

Inventor
C. E. Kenney
by K. S. Wyman
Attorney

Dec. 25, 1945.　　　　C. E. KENNEY　　　　2,391,786
TURBINE NOZZLE STRUCTURE
Filed May 18, 1944　　　　3 Sheets-Sheet 3

Inventor
C. E. Kenney
by K. A. Wyman
Attorney

Patented Dec. 25, 1945

2,391,786

UNITED STATES PATENT OFFICE 2,391,786

TURBINE NOZZLE STRUCTURE

Clarence E. Kenney, West Allis, Wis., assignor to Allis-Chalmers Manufacturing Company, Milwaukee, Wis., a corporation of Delaware Application May 18, 1944, Serial No. 536,117

14 Claims. (Cl. 253—78)

This invention relates to nozzle structures for elastic fluid turbines and the like and has for its object the provision of a simplified and improved split-ring nozzle construction which is of relatively light weight, extremely rigid and inexpensive to manufacture and which is effective to eliminate non-symmetrical expansion and thereby the warpage and possible failure of interconnected complementary parts.

In this connection, it has heretofore been common practice to form the nozzle structure by bolting together a pair of complementary, semicircular ring segments provided with abutting, horizontally extending bolt receiving flanges. However, the bolt receiving flanges are necessarily made relatively massive in order to withstand the pressure and expansion produced stresses and consequently expansion of the nozzle structure, which is neither symmetrical nor of uniform cross-section, results in an overstressing and warpage of interconnected parts. And such a prior construction is particularly objectionable for use in high temperature gas turbines of the type employed for supercharging internal combustion engines.

In accordance with this invention, the objectionable features hereinbefore mentioned may be substantially eliminated by positioning vane carrying, circular segments in end-to-end ring forming relation and clamping the segments together within a coaxial band or ring member exerting a uniform inward pressure on substantially continuous outer coaxial surface portions presented by the assembled segments; the ends of the segments being interlocked against relative movement in an axial direction by any suitable means such as radially extending keys or the like.

The construction of a nozzle diaphragm embodying the invention will become readily apparent as the disclosure progresses and particularly points out additional advantages and features of construction considered of special importance and of general application although shown and described as applied to the turbine structure disclosed in the copending application of Clarence E. Kenney and John R. Hagemann Serial No. 514,808, filed December 18, 1943.

Accordingly the invention may be considered as consisting of the various details of construction, correlations of elements and arrangements of parts as is more fully set forth in the appended claims and in the detailed description, reference being had to the accompanying drawings in which:

Figure 1:
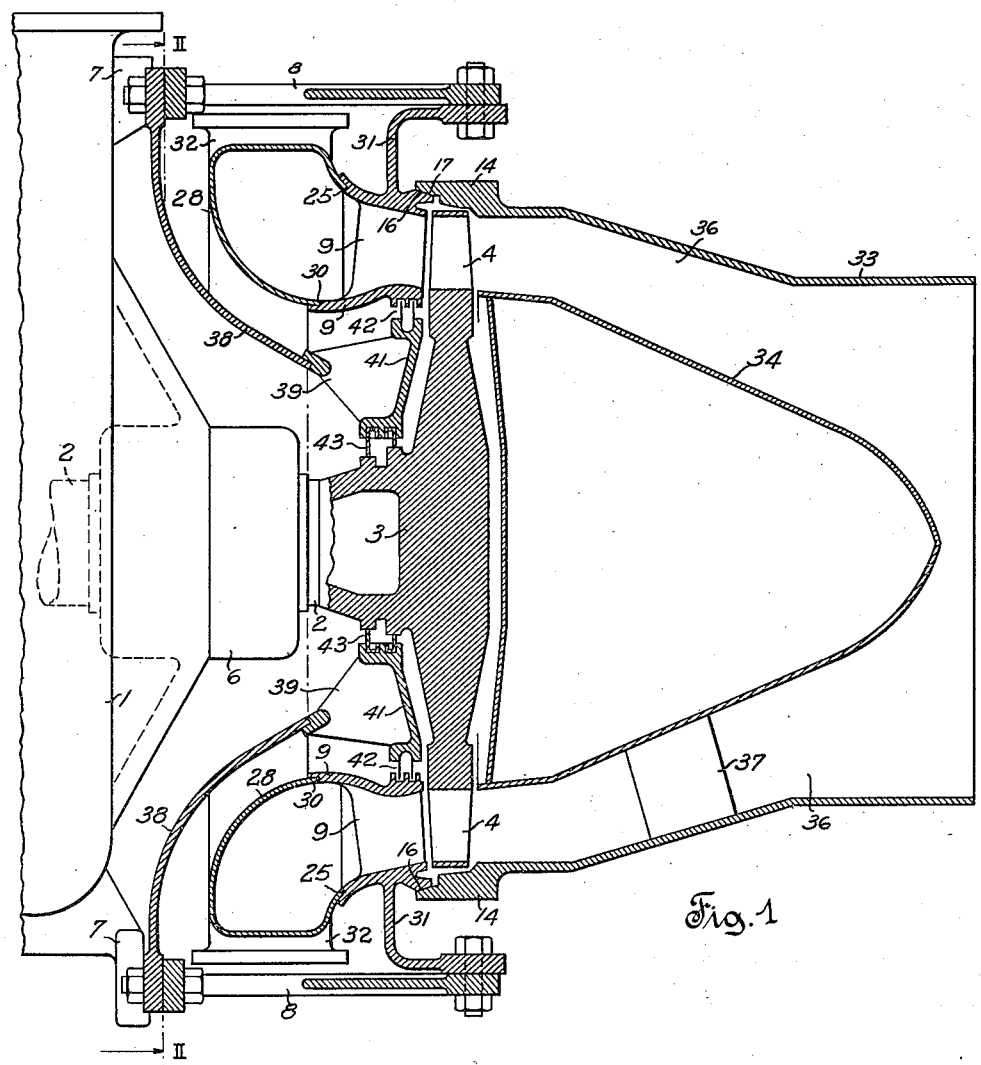
Fig. 1 illustrates in part longitudinal section a single stage supercharging type turbine embodying the invention.

Referring to Fig. 1, it is seen that the invention may be applied to a supercharger aggregate including a compressor casing 1 enclosing a compressor rotor (not shown) having a coaxial shaft portion 2 integral with a coaxial single stage gas turbine spindle or rotor 3 provided with blades 4 and rotatably supported in a bearing 6 fixedly mounted on the casing 1. In other words, the turbine rotor has a coaxial shaft portion 2 rotatably supported in a bearing carried by the compressor casing which in turn constitutes a fixed support in so far as the supercharger aggregate is concerned.

The turbine side of casing 1 is provided with a series of circumferentially spaced bosses or the like 7 to each of which is bolted or otherwise secured one end of an elongated axially extending flat member or strut 8; said members presenting free end portions which are disposed in coaxial spaced relation with respect to the turbine and which are substantially rigid in a circumferential direction and flexible in a radial direction relative to the turbine axis or rotor. Stated differently, the free end portions of the members 8 are substantially rigid in a tangential direction relative to a circle concentric to the axis of the turbine and flexible in a radial direction relative to said axis.

The blade carrying portion of rotor 3 is enclosed in a casing structure comprising, reference being also had to Figs. 2-8 inclusive, a pair of semicircular vane carrying nozzle segments 9 positioned in end-to-end ring forming relation with their abutting ends interlocked against relative axial movement by means of a key 11 disposed in the keyway formed by complementary recesses 12 and 13 in their plane abutting end surfaces provided by complementary vane sections uniting the ends of inner and outer vane-connected ring parts (see Fig. 8), and a coaxial clamping ring member 14 surrounding and compressibly engaging outer coaxial surface portions presented by the segments 9. In this connection, it will be noted that the ring parts and the vane-forming sections uniting the ends of same have contiguous inlet edge portions cut away to provide a circumferential gap between the inlet edge portions of abutting segments, that the outer ring parts of arcuate segments 9 (see Fig. 3) are each provided with outer beveled surface portions 16 forming a continuous beveled ring-like surface, and that the clamping ring member 14 is provided with a continuous internal beveled surface 17 complementary to the outer surfaces 16 presented by the segments 9. This construction is such that when the member 14 is positioned to surround the segments 9 and then moved coaxially toward same, the segments are securely clamped together in end-to-end ring forming relation within the member 14 as is clearly indicated in Fig. 3.

Figure 3:
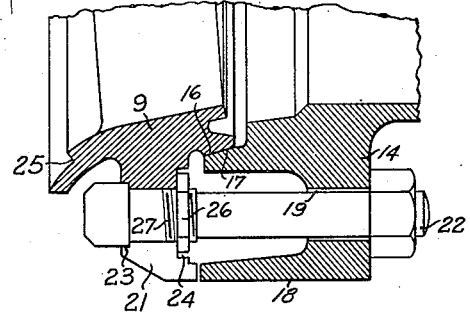
Fig. 3 is an enlarged detail showing coacting portions of the split ring and clamping band.
Figure 2:
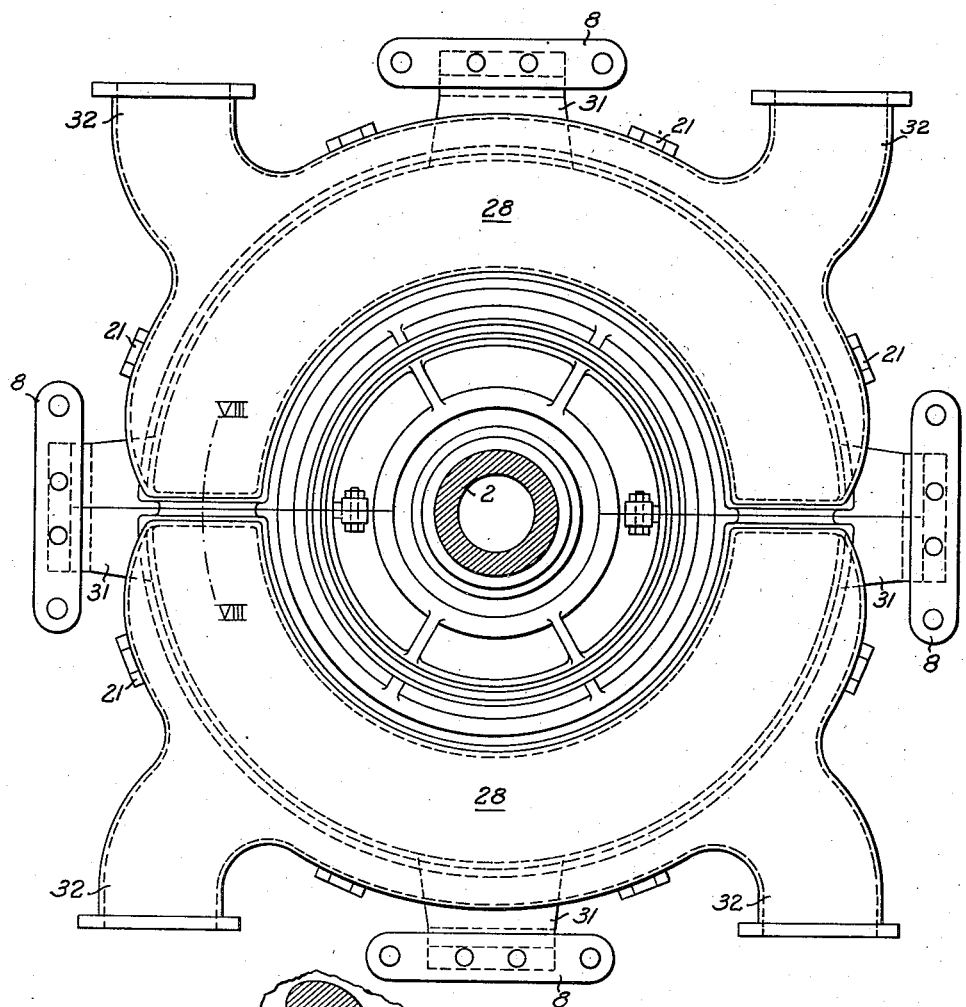
Fig. 2 is a section taken on line II—II of Fig. 1.
Figure 8:
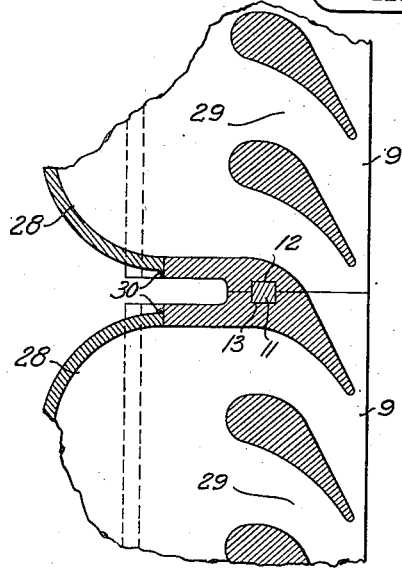
Fig. 8 is a developed section taken on line VIII—VIII of Fig. 2.
Figure 4:
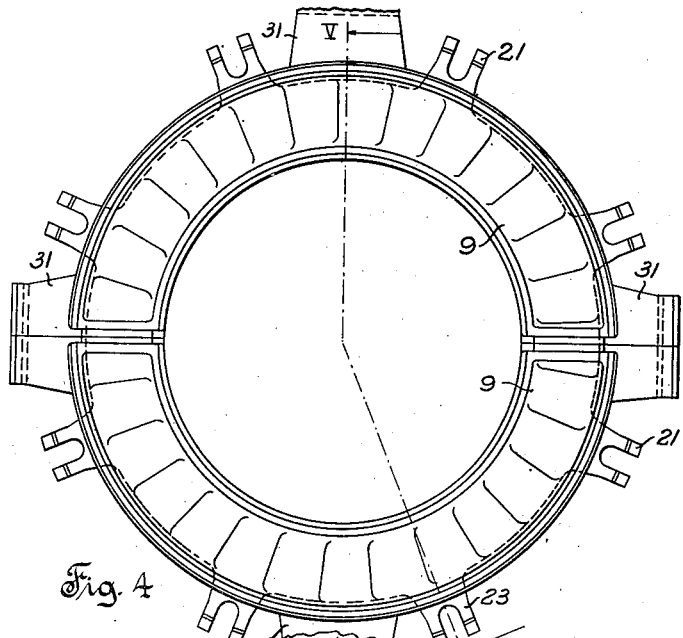
Fig. 4 is an end view of the split nozzle ring shown in Fig. 1.
Figure 6:
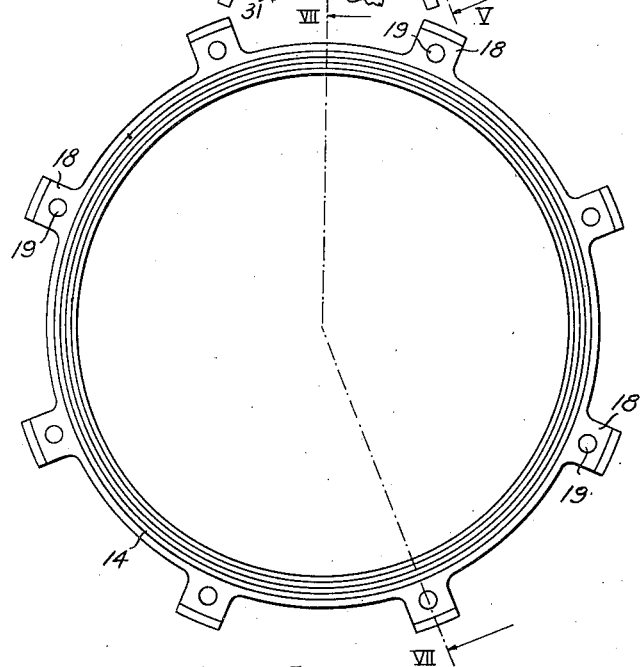
Fig. 6 is an end view of the nozzle ring engaging end of the clamping band.
Figure 5:
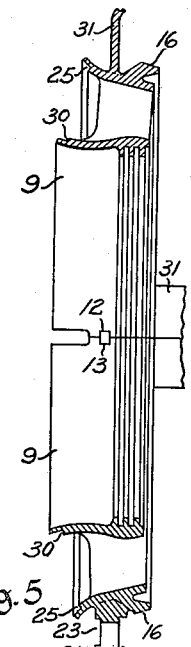
Fig. 5 is a section taken on line V—V of Fig. 4.
Figure 7:
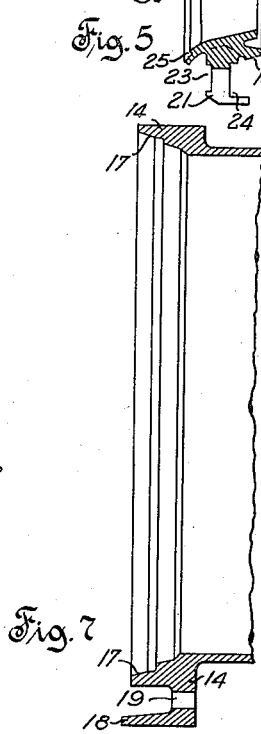
Fig. 7 is a section taken on line VII—VII of Fig. 6.

The outer periphery of member 14 is provided with a series of circumferentially spaced, radially extending lugs 18 each having an opening 19 extending therethrough parallel to the axis of the member and the outer periphery of segments 9 are each provided with a plurality of radially extending, bifurcated lugs 21; the lugs 21 on the ring-forming segments 9 conforming in number and arrangement to the lugs 18 presented by the clamping member 14. Member 14 is secured to segments 9 by means of bolts 22 which extend through the openings 19 in lugs 18 and between the bifurcations of the lugs 21 with the bolt head engaging the exposed side of lug 21 and with the nut thereon engaging the exposed side of lug 18. The opposite faces of each bifurcated lug 21 are preferably recessed as best shown in Figs. 3 and 5 to provide bolt head and washer receiving recesses 23 and 24, respectively; the bolt head receiving recess 23 snugly receiving the bolt head in order to prevent the bolt from turning when the nut is applied thereto and the washer receiving recess 24 being somewhat larger than the washer to be positioned therein in order to permit turning an internally threaded washer 26 on the threaded portion 27 of the bolt in order to facilitate assembly.

In this connection, the structure is assembled by placing the segments 9 in end-to-end ring forming relation whereupon key 11 is inserted in the keyway formed by the complementary recesses 12 and 13 to prevent an axial displacement of the segments, the bolts 22 are then inserted between the bifurcations of lugs 21 with the head portion thereof disposed in recess 23, next a washer 26 is placed on each bolt and threaded on portion 27 until the washer firmly engages the opposed face of lug 21 which holds the bolts in place in lugs 21, next ring member 14 is positioned with the holes 19 in lugs 18 alined with the bolts 22 and then moved axially toward segments 9 until beveled surface 17 engages the complementary beveled surface presented by the surface portions 16 of segments 9 whereupon nuts are applied to the bolts which extend through the holes 19 in lugs 18 and tightened to secure the segments 9 and member 14 in the assembled relation shown.

Each segment 9 is provided with a separate semicircular integral manifold 28 enclosing the inlet side of the vane-defined motive fluid directing passages 29 (see Figs. 2 and 8) and with a plurality of radially projecting, circumferentially spaced arms or the like 31 having their free ends bolted or otherwise secured to the free ends of the members 8 to thereby mount the casing structure comprising segments 9 and member 14 in operative coaxial relation to the turbine rotor 3. In this connection, manifold structures 28 may be attached to and carried by arcuate segments 9 by having their outer and inner peripheral edge portions welded to outer and inner shouldered inlet edge portions 25 and 30 presented by the outer and inner ring parts of each segment 9 and the arms 31 on said segments are preferably arranged to include a pair of diametrically oppositely extending arms of which each arm comprises two proximate portions disposed in side-by-side relation; one portion being integral with one of the segments and the other portion being integral with the next adjacent segment as is clearly shown in Figs. 2 and 4. Each manifold section is preferably provided with a pair of inlet conduits 32 adapted to be connected with the exhaust manifold system of an internal combustion engine or other gaseous motive fluid producing device (not shown).

The clamping member 14 may have integrally attached thereto an exhaust passage defining means comprising, for example, an outer coaxial shell 33 and an inner generally cone-shaped shell 34 enclosing the exhaust side of the turbine rotor and defining with the shell 33 an annular exhaust passage 36 receiving the motive fluid issuing from between the blades 4. Shell 34 may be coaxially supported within shell 33 by any suitable means such as radially extending struts 37 thereby providing a unitary casing structure including an inlet manifold portion or portions, a nozzle portion and an exhaust portion coaxially supported for substantially free radial expansion and contraction relative to the rotor 3 by means of the members 8.

Preferably the structure is also provided with a substantially rigid annular or funnel-shaped shield 38 which is carried by the bosses 7 and extends in coaxial spaced relation between the inlet manifold and nozzle portions of the casing structure and the opposed parts of the compressor casing 1, the bearing 6 and the shaft portion 2; said shield having secured to or formed integral with its inner periphery a plurality of circumferentially spaced brackets or projections 39 which in turn support an annular flange or disk member 41 positioned in proximate opposed relation to the adjacent side surface of the rotor 3. In order to prevent the escape of motive fluid into the passages formed on either side of shield 38, the outer and inner peripheral portions of disk 41 are provided with seal structures 42 and 43 adapted to engage the opposed portions of the nozzle structure and shaft 2, respectively.

The casing construction herein shown and described affords an extremely rigid and durable symmetrical casing structure which is inexpensive to manufacture and install and which is incapable of transmitting expansion produced stresses to the coacting parts of the aggregate thereby maintaining a greater degree of symmetry between the casing and rotor structures than has heretofore been possible. The invention embodies many features of general application with respect to elastic fluid turbines and it should therefore be understood that although the invention is illustrated and described as applied to a supercharger aggregate, it is not desired to limit the invention to the correlations of elements and details of construction herein shown and described as various modifications within the scope of the appended claims may occur to persons skilled in the art.

It is claimed and desired to secure by Letters Patent:

1. A nozzle structure for elastic fluid turbines comprising a plurality of arcuate nozzle segments positioned in end-abutting ring-forming relation with the ends of the segments interlocked to prevent relative axial movement, said segments each comprising inner and outer ring parts securely united in spaced concentric relation by a series of circumferentially spaced vanes including complementary vane sections uniting the ends of said ring parts and presenting therewith continuous plane end-surface portions disposed in abutting vane-forming relation with respect to the opposing ends of adjacent segments, and a continuous coaxial ring member having an internal edge portion compressibly engaging external coaxial surface portions of said outer ring parts to thereby secure said segments in coaxial ring-forming relation.

2. A nozzle structure for elastic fluid turbines comprising a plurality of arcuate nozzle segments positioned in end-abutting ring-forming relation and each comprising inner and outer ring parts securely united in spaced concentric relation by a series of circumferentially spaced vanes including complementary vane sections uniting the ends of said ring parts and presenting therewith continuous end-surface portions disposed in abutting vane-forming relation with respect to the opposing ends of adjacent segments, means interlocking the abutting ends of the segments against relative axial movement, said outer ring parts presenting external coaxial surface portions adjacent the outlet edges thereof, and a continuous coaxial ring member having an internal edge portion compressibly engaging said external coaxial surface portions to thereby secure said segments in coaxial ring-forming relation.

3. A nozzle structure for elastic fluid turbines comprising a plurality of arcuate nozzle segments positioned in end-abutting ring-forming relation and each comprising inner and outer ring parts securely united in spaced concentric relation by a series of circumferentially spaced vanes including complementary vane sections uniting the ends of said ring parts and presenting therewith continuous end surface portions disposed in abutting vane-forming relation with respect to the opposing ends of adjacent segments, a separate manifold-forming structure united with and carried by the inlet edge portions of the ring parts and vane sections included in each segment to thereby provide a combined inlet manifold and nozzle structure composed of separable segments having independent manifold portions, said outer ring parts presenting coaxially beveled external surface portions adjacent their outlet edges, a continuous ring member having an inner, coaxially beveled surface portion complementary to the beveled surface portions of said segments, and means detachably securing said ring member to external portions of said outer ring parts intermediate their inlet and outlet edges with its internal beveled surface portion surrounding and compressibly engaging the complementary external surface portions of said outer ring parts.

4. A rotor enclosing casing for elastic fluid turbines comprising a plurality of arcuate nozzle segments disposed in end-abutting ring-forming relation with their abutting ends interlocked against relative axial movement, said segments each including inner and outer ring parts interconnected by vanes and by a pair of vane sections uniting the ends of said ring parts and presenting therewith plane continuous end-surface portions disposed in abutting vane-forming relation with respect to the opposing ends of adjacent segments, a separate manifold-forming structure united with and carried by the inlet edge portions of the ring parts and pair of vane sections included in each segment to thereby provide a combined inlet manifold and nozzle structure composed of separable arcuate segments each having an independent manifold portion, and a continuous, rotor-blade surrounding ring member having an internal inlet edge portion compressibly engaging coaxial external surface portions of said outer ring parts.

5. A turbine structure comprising a blade carrying rotor, a rotor enclosing casing including a plurality of arcuate nozzle segments disposed in end-abutting ring-forming relation coaxially alongside the blade carrying portion of the rotor with their abutting ends interlocked against relative axial movement, said segments each including inner and outer ring parts interconnected by vanes and by a pair of vane sections uniting the ends of said ring parts and presenting therewith plane continuous end-surface portions disposed in abutting vane-forming relation with respect to the opposing ends of adjacent segments, a separable manifold-forming structure united with and carried by the inlet edge portions of the ring parts and pair of vane sections included in each segment to thereby provide a combined inlet manifold and nozzle structure composed of separable arcuate segments each having an independent manifold portion, a rotor-blade-tip-enclosing ring detachably secured to said outer ring parts and having an inlet edge portion compressibly engaging coaxial external surface portions of the outer ring parts, fixed means spaced from said casing, and parts supportingly connecting circumferentially spaced, peripheral portions of said outer ring parts with said fixed means.

6. In a turbine structure having a blade carrying rotor, and fixed means supporting the rotor, a rotor enclosing casing spaced from said fixed means, said casing including a plurality of arcuate nozzle segments disposed in end-abutting ring-forming relation coaxially alongside the blade carrying portion of the rotor with their abutting ends interlocked against relative axial movement, a separate manifold-forming structure united with and carried by the inlet edge portions of each segment to thereby provide a combined inlet manifold and nozzle structure composed of separable arcuate segments each having an independent manifold portion, a ring member coaxially enclosing the tips of the blades mounted on said rotor, said ring member having external inlet edge portions detachably secured to intermediate external portions of said nozzle segments and having a coaxial internal inlet edge portion compressibly engaging coaxial external outlet edge portions of said segments, and parts supportingly connecting circumferentially spaced, external portions of said segments with said fixed means.

7. In a turbine structure having a blade carrying rotor and fixed means supporting the rotor, a rotor casing spaced from said fixed means and including a plurality of arcuate nozzle segments disposed in end-abutting ring-forming relation, said end-abutting segments having a plurality of circumferentially spaced, outwardly extending supporting arms including at least one arm comprising a pair of similar parts projecting in slightly spaced parallel relation from proximate external portions of a pair of said segments, a separate manifold-forming structure united with and carried by the inlet edge portions of each segment to thereby provide a combined inlet manifold and nozzle structure composed of separable arcuate segments each having an independent manifold portion, a ring member coaxially enclosing the tips of the blades carried by said rotor, said ring member having external inlet edge portions detachably secured to intermediate external portions of said nozzle segments and having a coaxial internal inlet edge portion compressibly engaging coaxial external outlet edge portions of said segments, and a radially flexible element supportingly connecting the outer end of each of said arms with said fixed means.

8. A casing for elastic fluid turbine rotors comprising a plurality of arcuate nozzle segments positioned in end-abutting ring-forming relation, said segments having external portions intermediate their inlet and outlet edges provided with a plurality of circumferentially spaced, outwardly extending arms including two diametrically opposite arms each including a pair of similar parts projecting in slightly spaced parallel relation from proximate external portions of adjacent segments, a continuous ring member adapted to coaxially enclose the tip portions of rotor mounted blades, said ring member having external inlet edge portions detachably secured to intermediate external portions of said nozzle segments and having a coaxial internal inlet edge portion compressibly engaging coaxial external outlet edge portions of said segments, a fixed structure spaced from said casing, and an element supportingly connecting the outer end of each of said arms with circumferentially spaced portions of said structure.

9. A casing for elastic fluid turbine rotors comprising a plurality of arcuate nozzle segments disposed in end-abutting ring forming relation, said segments presenting coaxial external outlet edge portions and having external portions intermediate their inlet and outlet edges provided with a plurality of circumferentially spaced, outwardly extending arms adapted for connection with a corresponding number of separate supporting elements, one of said arms including a pair of similar parts projecting in slightly spaced parallel relation from proximate external portions of adjacent segments for connection with one of said elements, a continuous ring member adapted to coaxially enclose the tip portions of rotor mounted blades, said ring member having external inlet edge portions detachably secured to intermediate external portions of said nozzle segments and having a coaxial internal inlet edge portion compressibly engaging the coaxial external outlet edge portions of said segments, and a radially flexible supporting element connected with the outer end of each of said arms.

10. A casing for elastic fluid turbine rotors comprising a plurality of arcuate nozzle segments disposed in end-abutting ring-forming relation, a separate manifold-forming structure united with and carried by the inlet edge portions of each segment to thereby provide a combined inlet manifold and nozzle structure composed of separable arcuate segments each having an independent manifold portion, said segments presenting coaxial external outlet edge portions and having external portions intermediate their inlet and outlet edges provided with a plurality of circumferentially spaced arms extending radially outward beyond said manifold portions for connection with a corresponding number of separate supporting elements, one of said arms including a pair of similar parts projecting in slightly spaced parallel relation from proximate external portions of adjacent segments for connection with one of said elements, and a continuous ring member adapted to coaxially enclose the tip portions of rotor mounted blades, said ring member having external inlet edge portions detachably secured to intermediate external portions of said nozzle segments and having a coaxial internal inlet edge portion compressibly engaging the coaxial external outlet edge portions of said segments.

11. A rotor enclosing casing for elastic fluid turbines comprising a plurality of arcuate nozzle segments disposed in end-abutting relation with their ends interlocked against relative axial movements, said segments each including inner and outer ring parts interconnected by vanes and by a pair of vane sections uniting the ends of said ring parts and presenting therewith plane continuous end-surface portions disposed in abutting vane-forming relation with respect to the opposing ends of the adjacent segments, a separate manifold-forming structure united with and carried by the inlet edge portions of said ring parts and by inlet edge portions of said pair of vane sections disposed in circumferentially spaced relation with respect to the corresponding edge portions of the vane-forming sections on abutting segments to thereby provide a combined inlet manifold and nozzle structure composed of separable arcuate segments having independent manifold portions disposed in circumferentially spaced, end-opposed relation, and a rotor-blade-tip-enclosing ring member having an inlet edge portion compressibly engaging coaxial external portions of said outer ring parts.

12. A rotor enclosing casing for elastic fluid turbines comprising a plurality of arcuate nozzle segments disposed in end-abutting relation with their ends interlocked against relative axial movement, said segments each including inner and outer ring parts interconnected by vanes and by a pair of vane sections uniting the ends of said ring parts and presenting therewith plane continuous end-surface portions disposed in abutting vane-forming relation with respect to the opposing ends of the adjacent segments, said ring parts and the vane sections uniting the ends of same having contiguous inlet edge portions cut away to provide a circumferential gap between the inlet edge portions of abutting segments, a separate manifold-forming structure united with and carried by the inlet edge portions of the ring parts and pair of vane sections included in each segment to thereby provide a combined inlet manifold and nozzle structure composed of separable arcuate segments having independent manifold portions disposed in circumferentially spaced end-opposed relation, and a rotor-blade-tip-enclosing ring member having an inlet edge portion compressibly engaging coaxial external portions of said outer ring parts.

13. A rotor enclosing casing for elastic fluid turbines comprising a plurality of arcuate nozzle segments disposed in end-abutting relation with their ends interlocked against relative axial movement, said segments each including inner and outer ring parts interconnected by vanes and by a pair of vane sections uniting the ends of said ring parts and presenting therewith plane continuous end-surface portions disposed in abutting vane-forming relation with respect to the opposing ends of the adjacent segments, a separate manifold-forming structure united with and carried by the inlet edge portions of the ring parts and pair of vane sections included in each segment to thereby provide a combined inlet manifold and nozzle structure composed of separable arcuate segments having independent manifold portions disposed in circumferentially spaced end-opposed relation, said outer ring part presenting coaxial external outlet edge portions and having a plurality of circumferentially spaced arms extending radially outward beyond said manifold portions for connection with a corresponding number of separate supports, one of said arms including a pair of similar parts projecting in slightly spaced parallel relation from proximate external portions of adjacent segments for connection with a single supporting element, and a ring member adapted to coaxially enclose the tip portions of rotor mounted blades, said ring member having external inlet edge portions detachably secured to intermediate external portions of said outer ring parts and having a coaxial internal inlet edge portion compressibly engaging the coaxial external outlet edge portions of the outer ring part.

14. A rotor enclosing casing for elastic fluid turbines comprising a plurality of arcuate nozzle segments disposed in end-abutting relation with their ends interlocked against relative axial movement, said segments each including inner and outer ring parts interconnected by vanes and by a pair of vane sections uniting the ends of said ring parts and presenting therewith plane continuous end-surface portions disposed in abutting vane-forming relation with respect to the opposing ends of the adjacent segments, a separate manifold-forming structure united with and carried by the inlet edge portions of the ring parts and pair of vane sections included in each segment to thereby provide a combined inlet manifold and nozzle structure composed of separable arcuate segments having independent manifold portions disposed in circumferentially spaced, end-opposed relation, and a rotor-blade-tip-enclosing ring member having an inlet edge portion compressibly engaging coaxial external portions of said outer ring parts.

CLARENCE E. KENNEY.